(12) United States Patent
Ducasse (10) Patent No.: US 12,312,065 B2
(45) Date of Patent: May 27, 2025

(54) AIRCRAFT DOOR EQUIPPED WITH A SYSTEM FOR ADJUSTMENT IN POSITION AND METHOD FOR INSTALLING SUCH A DOOR

(71) Applicant: LATECOERE, Toulouse (FR)

(72) Inventor: Jean François Ducasse, Miradoux (FR)

(73) Assignee: Latecoere, Toulouse (FR)

( * ) Notice: Subject to any disclaimer, the term of this patent is extended or adjusted under 35 U.S.C. 154(b) by 0 days.

(21) Appl. No.: 18/262,050

(22) PCT Filed: Jan. 27, 2022

(86) PCT No.: PCT/EP2022/051947
§ 371 (c)(1),
(2) Date: Jul. 19, 2023

(87) PCT Pub. No.: WO2022/162090
PCT Pub. Date: Aug. 4, 2022

(65) Prior Publication Data
US 2024/0067325 A1     Feb. 29, 2024

(30) Foreign Application Priority Data
Jan. 28, 2021   (FR) ..................................... 2100839

(51) Int. Cl.
*B64C 1/14*        (2006.01)
(52) U.S. Cl.
CPC ............ *B64C 1/143* (2013.01); *B64C 1/1461* (2013.01)
(58) Field of Classification Search
CPC ..... B64C 1/143; B64C 1/1461; B64C 1/1407; B64C 1/1423
See application file for complete search history.

(56) References Cited

U.S. PATENT DOCUMENTS

2006/0266888 A1\* 11/2006 Matsch .................. B64D 25/14
244/905
2007/0215032 A1\* 9/2007 Melberg .................. G01K 5/62
116/218

(Continued)

FOREIGN PATENT DOCUMENTS

| FR | 2325425 | 5/2011 |
| FR | 3097194 | 12/2020 |
| FR | 3097196 | 12/2020 |

OTHER PUBLICATIONS

Machine translation of reference Dubosc et al. (FR Patent No. 3,097,194 A1) Pub date Dec. 18, 2020 (Year: 2020).\*

*Primary Examiner* — Rodney A Bonnette
(74) *Attorney, Agent, or Firm* — Defillo & Associates, Inc.; Evelyn A. Defillo (57) ABSTRACT

An aircraft door mounted in a fuselage in a reference frame X, Y, Z, having a casing, a door leaf and a support arm enabling the door leaf to be installed and the position thereof to be adjusted relative to the fuselage by a pair of fasteners. Each fastener (10, 40) includes a pivot (16, 46) rotatable about a common axis parallel to the axis Z, a base (13, 43) fastened to the casing (3), and a trolley (14, 44) movable on this base (13, 43), the base (13, 43) and the trolley (14, 44) of each fastener (10, 40) forming two translational adjustment links in directions parallel to the X and Y axes, these directions determining adjustment axes (11, 12; 41, 42) secant in a plane parallel to the plane XY.

12 Claims, 7 Drawing Sheets

(56) References Cited

U.S. PATENT DOCUMENTS

2018/0195325 A1\* 7/2018 Amante ................. B64C 27/04
2023/0264803 A1\* 8/2023 Devillez ............... B64C 1/1461
                                                        244/129.5

\* cited by examiner

AIRCRAFT DOOR EQUIPPED WITH A SYSTEM FOR ADJUSTMENT IN POSITION AND METHOD FOR INSTALLING SUCH A DOOR

CROSS REFERENCE TO RELATED APPLICATION

This application is a national stage entry of PCT/EP2022/051947 filed Jan. 27, 2022, under the International Convention and claiming priority over French Patent Application No. FR2100839 filed Jan. 28, 2021.

TECHNICAL FIELD

The invention relates to an aircraft door, incorporating a position adjustment system in the hanging system, as well as a method for installing said door.

When hanging an aircraft door, the outer surface of the fuselage must be as uniform as possible, and therefore the position of the door must be precisely adjusted in the closed position to fit the skin of the fuselage.

Typically, aircraft doors essentially comprise a frame, a door leaf, and a support arm connecting the casing to the door leaf. The casing is the static portion of the door, forming the coaming of the door leaf and carrying the hanging system of the door leaf via the arm. Furthermore, the door leaf is movable and notably includes a wall that closes the casing in the closed position. The support arm is articulated with the door leaf and the casing, and enables the door to be opened or closed between a fully open position, in which the door leaf is clear of the casing, and a closed position, in which the door leaf closes the casing.

When the door is in closed position, the outer wall of the door leaf must be able to follow the alignment of the skin of the fuselage for reasons of aerodynamic performance. During installation, such adjustment of the door is required. This adjustment is made by precise adjustment systems along the different orthogonal axes of the direct reference frame X, Y, Z of the aircraft 1, the axis X being the longitudinal axis conventionally oriented towards the rear of the aircraft, the axis Y being the transverse axis, and the axis Z being the vertical axis, as described in detail below. For each axis, translational and/or rotational adjustments are typically made during installation of the door.

PRIOR ART

The adjustment means for aircraft doors in the prior art generally consist of fastenings between the main door components (casing, door leaf and door arm) that enable three types of adjustment: translation in both directions along the axis X of the airplane, rotation about an axis parallel to the axis X of the airplane, and rotation about an axis parallel to the axis Y of the airplane.

These adjustments are conventionally made by adding or removing shims or using grooved shims, and therefore do not enable precise, continuous adjustment during installation. Furthermore, these three types of adjustment are made in two separate areas: the connection zone between the door arm and the door leaf, and the connection zone between the door arm and the casing. These operations take a long time, and the presence of several operators is recommended. This operation is carried out on different zones of the door, and each adjustment influences other adjustments, because the adjustment process is iterative.

Fastenings enabling faster, more precise door adjustments have been developed to overcome the limitations of conventional adjustment methods relating to the number of zones and adjustment precision. However, these fastenings take up a lot of space and need to be installed on a large casing, which limits the suitability thereof in aircraft cabins. Furthermore, for doors located close to the aircraft cockpit, the greater curvature of the fuselage means that one of the fasteners has to be offset towards the inside of the cabin to keep the fasteners vertically aligned.

DESCRIPTION OF THE INVENTION

The invention is intended to improve the aircraft doors in the prior art in terms of adjustment during installation, using a compact, adjustment system that is easy to integrate and provides a precise fit relative to the skin of the fuselage. In particular, the fastenings positioned where the fuselage curvature is significant should be as small as possible to minimize the offsetting between these fastenings and the door coaming.

To achieve this, the invention incorporates translational and rotational adjustments into the interface between the door arm and the casing by means of a single pair of fasteners, each fastener enabling separate translational adjustments along X and Y in the same plane. Such an assembly provides a compact system that is easy to install on the fuselage structures. Furthermore, the fasteners are arranged so that adjustments made on both fasteners in the same direction by the same amount along X or Y respectively cause a simple overall translational movement of the door leaf along X or Y respectively.

Adjustments made to both fasteners by the same amount in opposite directions along X or Y respectively cause a simple overall rotational movement, the axis of rotation being parallel to the axis Y or the axis X respectively, and passing through the mid-point between the fasteners. Any other combination of adjustments causes an overall movement combining a simple translational movement and a simple rotational movement. These translational and rotational adjustments can be combined successively and iteratively to bring the door into the desired position.

For this purpose, the present invention relates to an aircraft door mounted in a fuselage having a reference frame X, Y, Z and comprising a casing forming a coaming rigidly connected to the fuselage, a door leaf, and a support arm. This support arm connects the door leaf to the casing by means of a hanging system, enabling the door leaf to be installed and the position thereof to be adjusted in relation to the fuselage. This hanging system is made up of a pair of fasteners, each of which has a pivot for rotation about a common axis parallel to the axis Z. Each fastener also comprises two main parts:

a static support (hereinafter referred to as the base) positioned on the casing, and a fitting (hereinafter referred to as the trolley) that is movable on this base along the axis Y. The base and the trolley of each fastener form two adjustment links, each of these links being in continuous translation along directions parallel to the X and Y axes of the aircraft, these directions forming secant adjustment axes in a plane parallel to the plane XY for each of the fasteners. The adjustments of the door leaf of the door along X, respectively the adjustments along Y, are simple translational adjustments when applied to the fasteners in the same direction and by the same amount along X, respectively along Y, and/or are simple rotational adjustments about an axis parallel to the axis Y of the aircraft, respectively an axis parallel to the axis X of the aircraft, when applied in opposite directions and by the same amount along X, respectively along Y.

Such a configuration positions all of the adjustment links along X and Y in a small area, enabling the hanging system to be mounted on a conventional casing structure without significantly increasing the height of the frames for receiving the fasteners in the door coaming. Another advantage of this hanging system is the ease of access to the adjustment means provided by the proximity thereof, and the resulting time savings.

In a preferred embodiment, the trolley of each fastener comprises a chassis comprising two cylindrical bodies forming a "T" with:
- a solid cylinder that forms a vertical bar of the "T" oriented in a direction parallel to the axis Y of the aircraft and, together with the base, forms the translational adjustment link for the door leaf along this axis Y, and
- a hollow cylinder that forms a horizontal bar of the "T" oriented in a direction parallel to the axis X of the aircraft and, together with the pin of the door arm, forms the translational adjustment link for the door leaf along this axis X.

Each of these adjustments enables fast, precise and continuous adjustment, unlike the solutions in the prior art, particularly those using shims.

According to advantageous embodiments, the adjustment axes are oriented as follows:
- along the axis X of the aircraft, the adjustment axes of the fasteners are oriented in the same direction and are outside the door coaming,
- along the axis Y of the aircraft, the adjustment axes are oriented in opposite directions, with the axis of an upper fastener being oriented towards the inside of the cabin and the axis of a lower fastener being oriented towards the outside of the cabin, the upper fastener being arranged above the lower fastener along the axis Z, and
- each fastener has a mechanism for preventing rotation about the axis Y arranged between the trolley and the base, in particular in the form of a sliding guide link oriented along the axis Y. Advantageously, the sliding link has an oblong cross-section with straight parallel longitudinal sides, the sliding link passing through bores formed in extensions of the trolley and the base.

It should be noted that, since the adjustments are made by translational movements, rotational adjustment about the axis Y of the door leaf is not prevented by this locking mechanism.

In a preferred embodiment, the adjustment links are screw-nut connections in which, for adjustment along the axis X of the aircraft, the screw is formed by a threaded sleeve and the nut is formed by the hollow cylinder belonging to the chassis of the trolley, and for adjustment along the axis Y of the aircraft, the screw is formed by a threaded sleeve and the nut is formed by the threaded ring rigidly connected to the base.

The screw-nut connections transform a rotational movement into a translational movement by means of internal and external threads along the adjustment axes.

Advantageously, the screw-nut connections are kept short for reasons of mechanical strength.

The invention also relates to an aircraft with at least one door fitted with a door hanging system as defined above.

The invention also relates to a method for installing an aircraft door fitted with a hanging system as defined above, comprising the following phases:
an initial positioning phase comprising:
  joining the door arm to the door leaf,
  connecting each fastener of the hanging system to the casing and to the door arm,
  positioning the door leaf in the casing in the closed position, and
a phase of adjusting the position of the door in the closed position in order to align the door leaf with the fuselage, and to adjust the position of the door in the casing to seal the fuselage, using at least one of the following steps, taken separately or in combination:
  to move the door in translation along the axis X of the aircraft: in the upper fastener and the lower fastener, move the threaded adjustment sleeves oriented in the direction X of the aircraft by the same amount and in the same direction,
  to move the door in translation along the axis Y of the aircraft: in the upper fastener and the lower fastener, move the threaded adjustment sleeves oriented in the direction Y of the aircraft by the same amount and in the same direction,
  to rotate the door about an axis parallel to the axis X of the aircraft: in the upper fastener and the lower fastener, move the threaded adjustment sleeves oriented in the direction Y of the aircraft by the same amount and in opposite directions, and
  to rotate the door about an axis parallel to the axis Y of the aircraft: in the upper fastener and the lower fastener, move the threaded adjustment sleeves oriented in the direction X of the aircraft by the same amount and in opposite directions.

PRESENTATION OF THE FIGURES

Other data, features and advantages of the present invention are set out in the non-limiting description below, with reference to the attached figures which show, respectively.

DETAILED DESCRIPTION

In this text, the terms "upper" and "lower" refer to the relative positions of components of an airplane when the airplane is on the ground.

Figure 1:
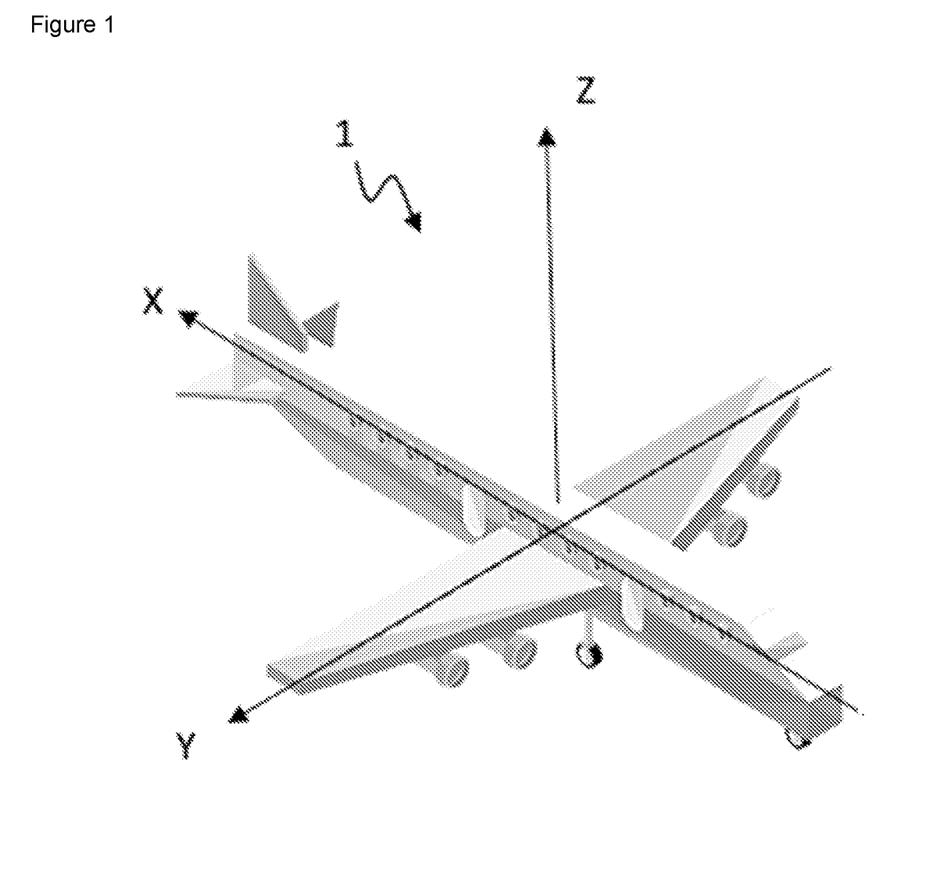
FIG. 1 is a perspective view of an airplane with a conventional reference frame X, Y, Z.

The overview in FIG. 1 shows an airplane 1 in perspective along the different axes of an orthogonal reference frame XYZ. The axis X corresponds to the longitudinal axis of the aircraft, conventionally oriented from the front to the rear of the airplane. The axis Z is the vertical axis oriented towards the top of the airplane, and the axis Y is the transverse axis, oriented so that the reference frame formed by the axes X, Y and Z is a direct reference frame.

Figure 2:
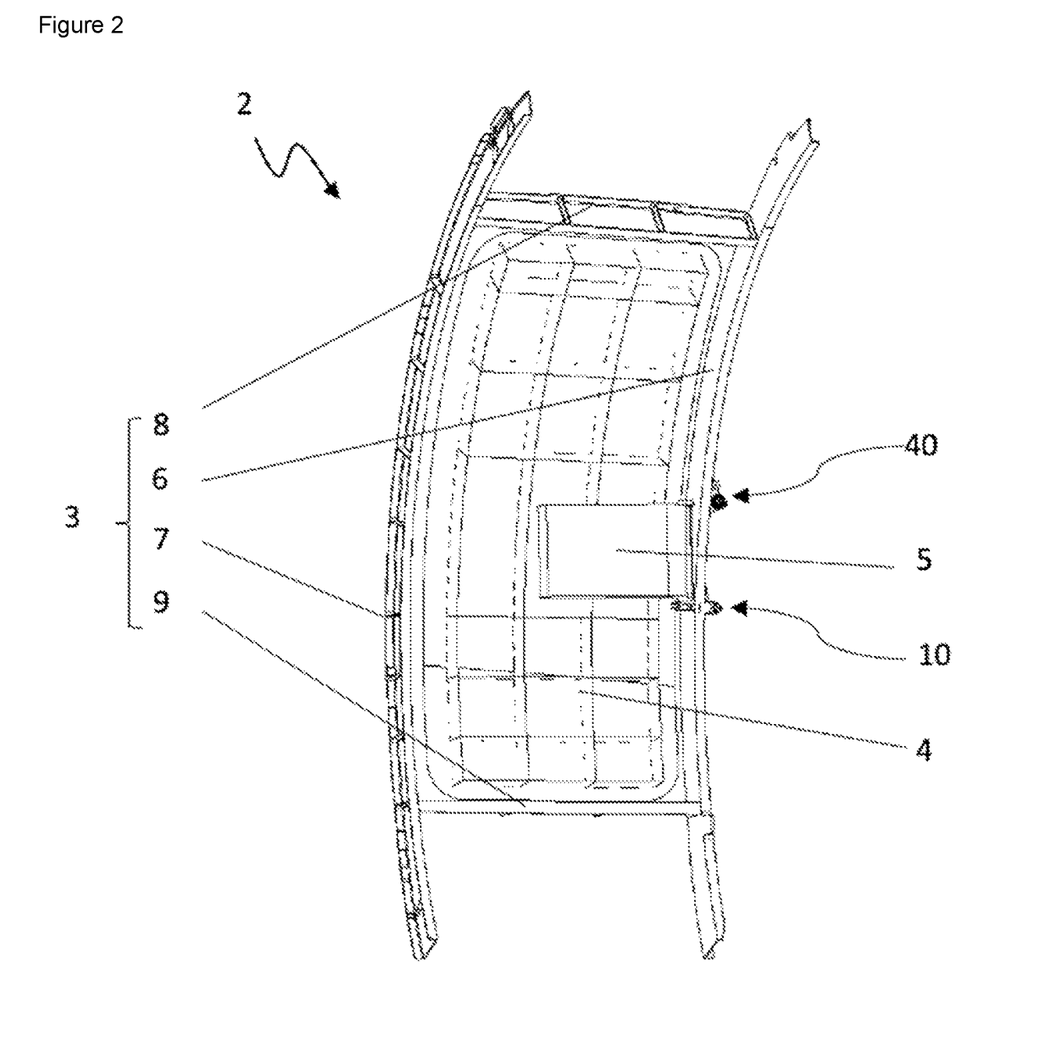
FIG. 2 is a front view of an airplane door comprising a casing, a door leaf and a connecting door arm.

FIG. 2 is an overview of the door 2, in which the casing 3 forms a door coaming rigidly connected to the fuselage of the airplane (not shown). This casing 3 comprises a portion of the front vertical frame 6 and the rear vertical frame 7, as well as two cross members, an upper cross member 8 and a lower cross member 9. In aeronautics, frames are ring-shaped structural parts that provide the shape of the fuselage. The door leaf 4 is a movable door that closes the casing in the closed position and opens the casing in the open position. The door arm 5 connects the casing to the door leaf. According to the invention, the arm 5 is notably connected to the casing 3 via two fasteners, specifically an upper fastener 40 arranged above a lower fastener 10.

Figure 3:
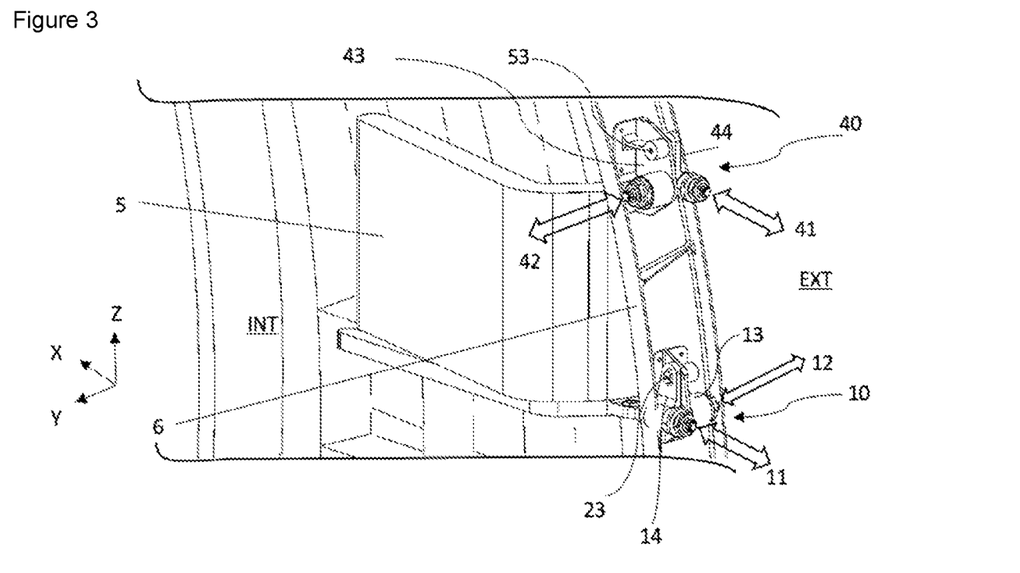
FIG. 3 is a partial perspective view of the door as shown in FIG. 2, with an upper fastener and a lower fastener according to an example embodiment.

More specifically, FIG. 3 shows the upper fastener 40 and the lower fastener 10 connecting the door arm 5 to the casing 3. These two fasteners 10, 40 are fastened, in this example, to the front vertical frame 6. Each of the fasteners 10 and 40 respectively enables a two-way adjustment (double arrows 11, 41) parallel to the axis X and a two-way adjustment (double arrows 12, 42) parallel to the axis Y.

FIG. 3 also shows the orientation of the adjustment links: along the axis X, the threaded adjustment sleeves 19, 49 of the two fasteners 10, 40 are arranged on the same side in relation to the vertical frame 6, and are therefore oriented in the same direction. In this example, the threaded adjustment sleeves 20, 50 of the fasteners 10, 40 along the axis Y are arranged and oriented in opposite directions: the upper fastener 40 is adjusted along the axis Y towards the inside INT of the cabin of the airplane, and the lower fastener 10 is adjusted towards the outside EXT of the cabin. In another example embodiment, if the structure of the casing 3 (see FIG. 2) is sufficiently large, the lower fastener 10 can be adjusted along the axis Y towards the inside INT of the cabin.

Figure 4A:
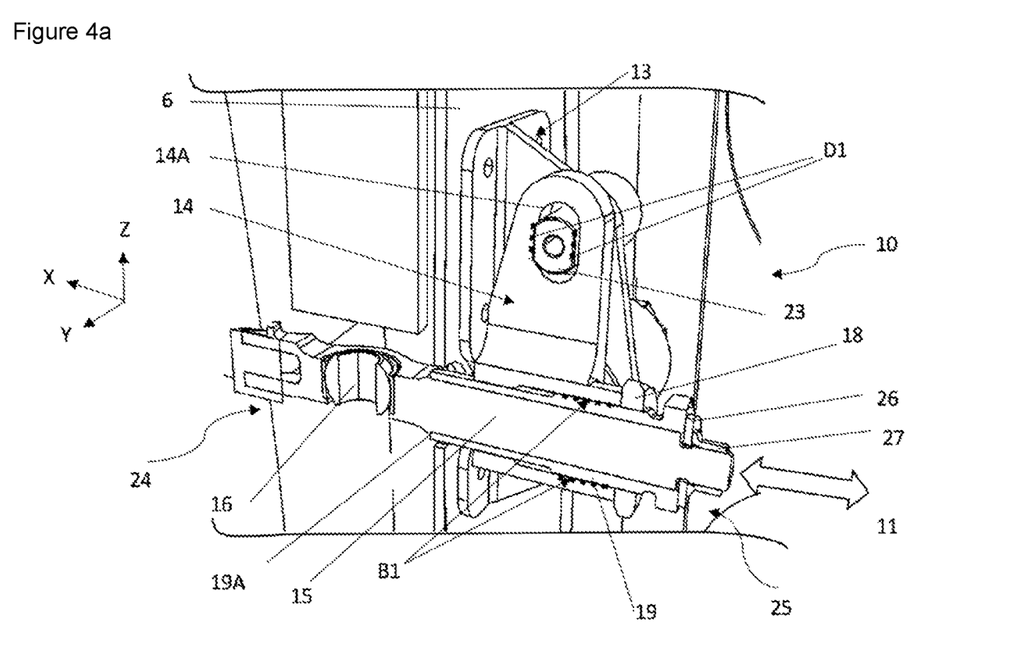
FIG. 4a is a cross-section view of the lower fastener in the planes XZ.
Figure 4B:
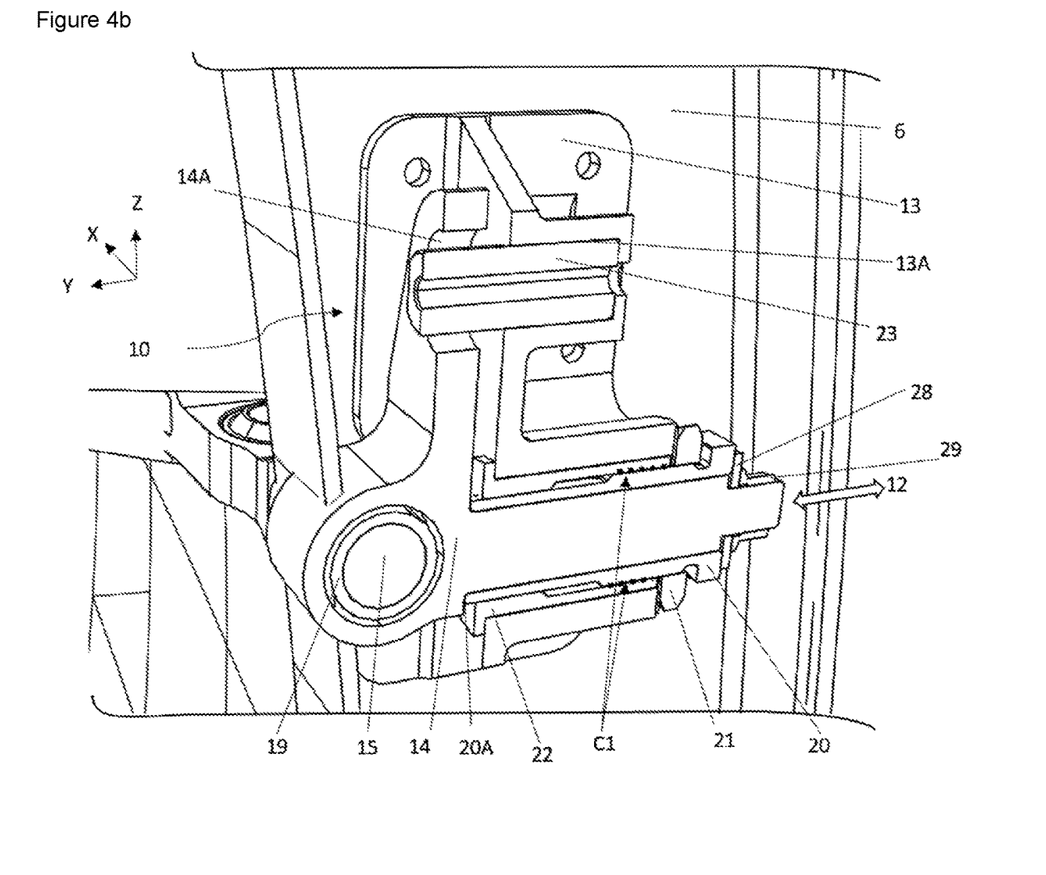
FIG. 4b is a cross-section view of the lower fastener in the planes YZ.

FIGS. 4a and 4b are partial cross-section views of the lower fastener 10 in the planes XZ and YZ respectively. This lower fastener 10 comprises two main parts that are connected by the screw-nut connection C1 and by the sliding link D1 along the axis Y via the guide pin 23, specifically: a base 13 hung on the front vertical frame 6 and a trolley 14.

The guide pin 23 is rigidly connected in a bore 13A made in an extension of the base 13 and arranged in a bore 14A made in an upper extension of the trolley 14. Under these conditions, this sliding link D1 is located, in this example embodiment, above and parallel to the screw-nut connection C1, which enables translational adjustment in both directions (double arrow 12) along the axis Y of the lower fastener 10 (see FIG. 4b), as detailed below.

This guide pin 23 is rigidly connected to the base 13 via the matching bore 13A in said base, and has an oblong portion with two symmetrically opposed vertical flats that act as translational guide surfaces for the trolley 14 via the matching oblong bore 14A in said trolley 14. Said sliding link D1 therefore prevents the trolley 14 from rotating about the axis Y.

The cross-section view in FIG. 4a in particular shows a door-arm pin 15 connecting the door arm 5 to the lower fastener 10. There is a pivot link 16 at one end 24 enabling the door arm 5 to rotate about an axis substantially parallel to the axis Z.

At the other end 25 of this door-arm pin 15 is the screw-nut connection B1 for making fine adjustments along the axis X via a threaded sleeve 19 in which the door-arm pin 15 is fitted. A washer 26 and a clamping nut 27 hold the door-arm pin 15 in the threaded sleeve 19, which is in turn held by the screw-nut connection B1 in the trolley 14 of the lower fastener 10. A locknut 18 locks the lower fastener 10 in the desired translational adjustment position along the axis X.

The cross-section view in FIG. 4b illustrates the connections between the base 13 and the trolley 14, and in particular the screw-nut connection C1 that enables precise adjustment along the axis Y. A threaded ring 22 is fitted and immobilized in the base 13, and the trolley 14 is fitted in a threaded sleeve 20: the threaded ring 22 represents the nut in the screw-nut connection C1, and the threaded sleeve 20 represents the screw. A washer 28 and a clamping nut 29 hold the trolley 14 in the threaded sleeve 20. The screw-nut connection C1 holds the threaded sleeve 20 in the threaded ring 22, which is fitted and immobilized in the base 13 of the lower fastener 10. A locknut 21 locks the lower fastener 10 in the desired translational adjustment position along the axis Y.

Figure 5:
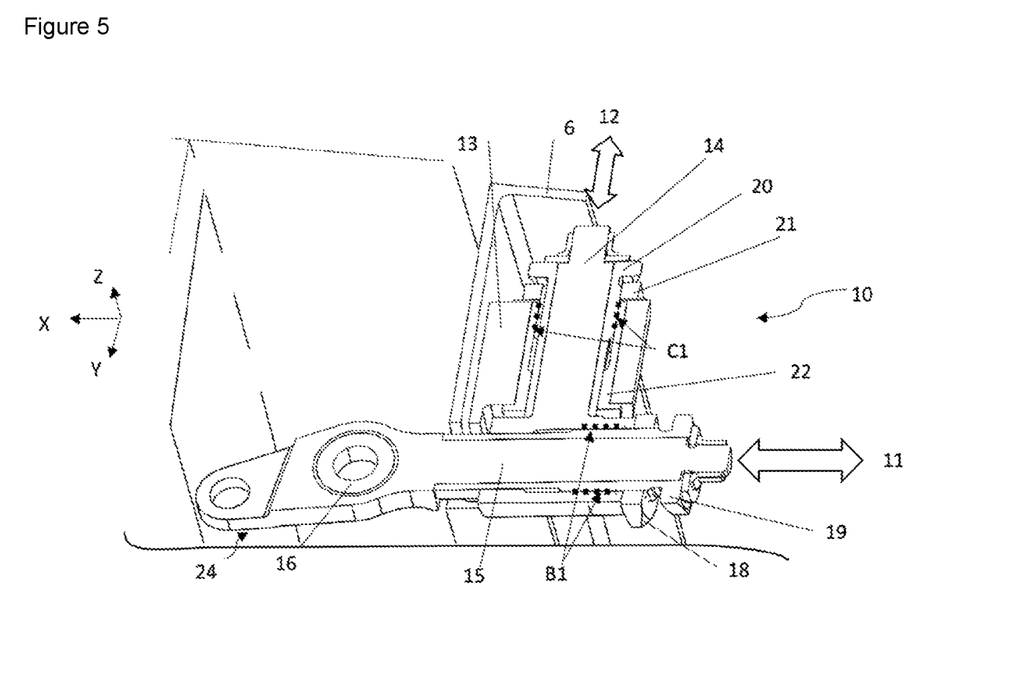
FIG. 5 is a cross-section view of the lower fastener in the planes XY.

The partial cross-section view in FIG. 5 shows the lower fastener 10 in the plane XY, the frame 6 of the door coaming, and the components of the lower fastener 10: the base 13 and the trolley 14.

The lower portion of the trolley 14 has a chassis forming a "T" comprising two cylindrical members: one member that is hollow, partially threaded and aligned with the axis X forming the horizontal bar of the "T", and one member that is solid and aligned with the axis Y forming the vertical bar of the "T".

The door-arm pin 15 and the threaded sleeve 19 thereof are inserted into this horizontal bar of the "T" of the chassis of the trolley 14. Thus, the translational adjustment along the axis X (double arrow 11) of the lower fastener 10 is provided in the horizontal bar of the "T" by the screw-nut connection B1, in which the threaded sleeve 19 corresponds to the screw and the partially threaded hollow cylinder of the chassis of the trolley 14 corresponds to the nut.

The vertical bar of the "T" of the chassis of the trolley 14 is inserted into the threaded sleeve 20 in the screw-nut connection C1 with the threaded ring 22 rigidly fitted into the base 13. This screw-nut connection C1 provides the translational adjustment along the axis Y (double arrow 12) of the lower fastener 10 in the vertical bar of the "T".

Figure 6A:
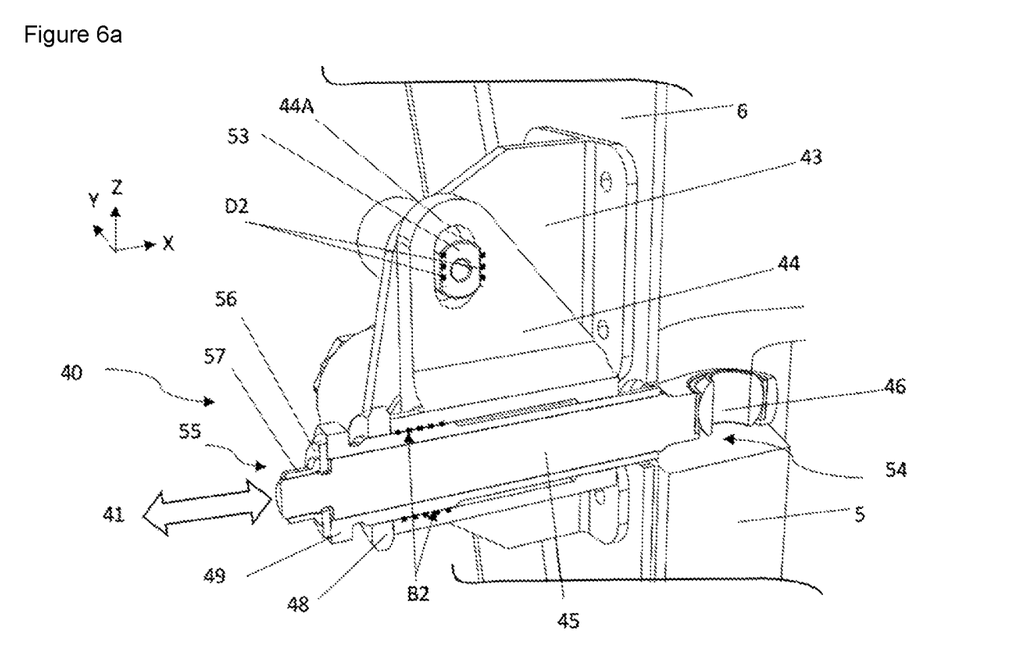
FIG. 6a is a cross-section view of the upper fastener in the planes XZ.
Figure 6B:
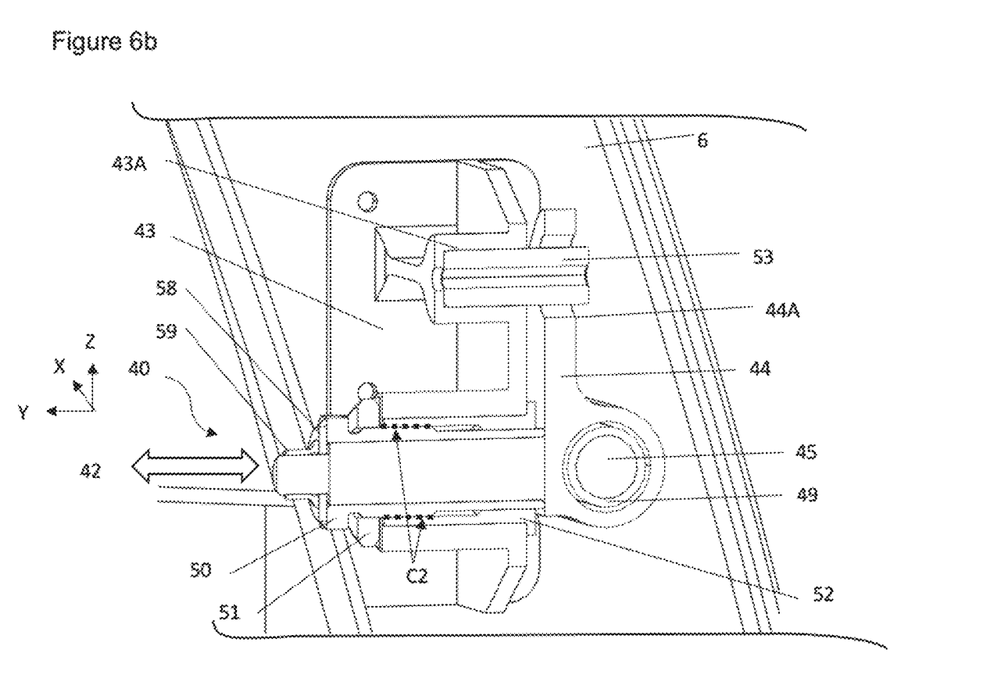
FIG. 6b is a cross-section view of the upper fastener in the planes YZ.

FIGS. 6a and 6b are partial cross-section views of the upper fastener 40 in the planes XZ and YZ respectively. This upper fastener 40 comprises two main parts, connected by the screw-nut connection C2 and by the sliding link D2 along the axis Y via the guide pin 53, specifically: a base 43 hung on the front vertical frame 6 and a trolley 44.

The guide pin 53 is rigidly connected in a bore 43A made in an extension of the base 43 and arranged in a bore 44A made in an upper extension of the trolley 44. Under these conditions, this sliding link D2 is located, in this example embodiment, above and parallel to the screw-nut connection C2, which enables translational adjustment in both directions (double arrow 42) along the axis Y of the upper fastener 40 (see FIG. 6b), as detailed below.

This guide pin 53, similarly to the guide pin 23, is rigidly connected to the base 43 via the matching bore 43A in said base, and has an oblong portion with two symmetrically opposed vertical flats that act as translational guide surfaces for the trolley 44 via the matching oblong bore 44A in said trolley 44. Said sliding link D2 therefore prevents the trolley 44 from rotating about the axis Y.

The cross-section view in FIG. 6a in particular shows a door-arm pin 45 connecting the door arm 5 to the upper fastener 40. There is a pivot link 46 at one end 54 enabling the door arm 5 to rotate about an axis substantially parallel to the axis Z.

At the other end 55 of this door-arm pin 45 is the screw-nut connection B2 for making fine adjustments along the axis X via a threaded sleeve 49 in which the door-arm pin 45 is fitted. A washer 56 and a clamping nut 57 hold the door-arm pin 45 in the threaded sleeve 49, which is in turn held by the screw-nut connection B2 in the trolley 44 of the upper fastener 40. A locknut 48 locks the upper fastener 40 in the desired translational adjustment position along the axis X.

The cross-section view in FIG. 6b illustrates the connections between the base 43 and the trolley 44, and in particular the screw-nut connection C2 that enables precise adjustment along the axis Y. A threaded ring 52 is fitted and immobilized in the base 43, and the trolley 44 is fitted in a threaded sleeve 50: the threaded ring 52 represents the nut in the screw-nut connection C2, and the threaded sleeve 50 represents the screw. A washer 58 and a clamping nut 59 hold the trolley 44 in the threaded sleeve 50. The screw-nut connection C2 holds the threaded sleeve 50 in the threaded ring 52, which is fitted and immobilized in the base 43 of the upper fastener 40. A locknut 51 locks the upper fastener 40 in the desired translational adjustment position along the axis Y.

Figure 7:
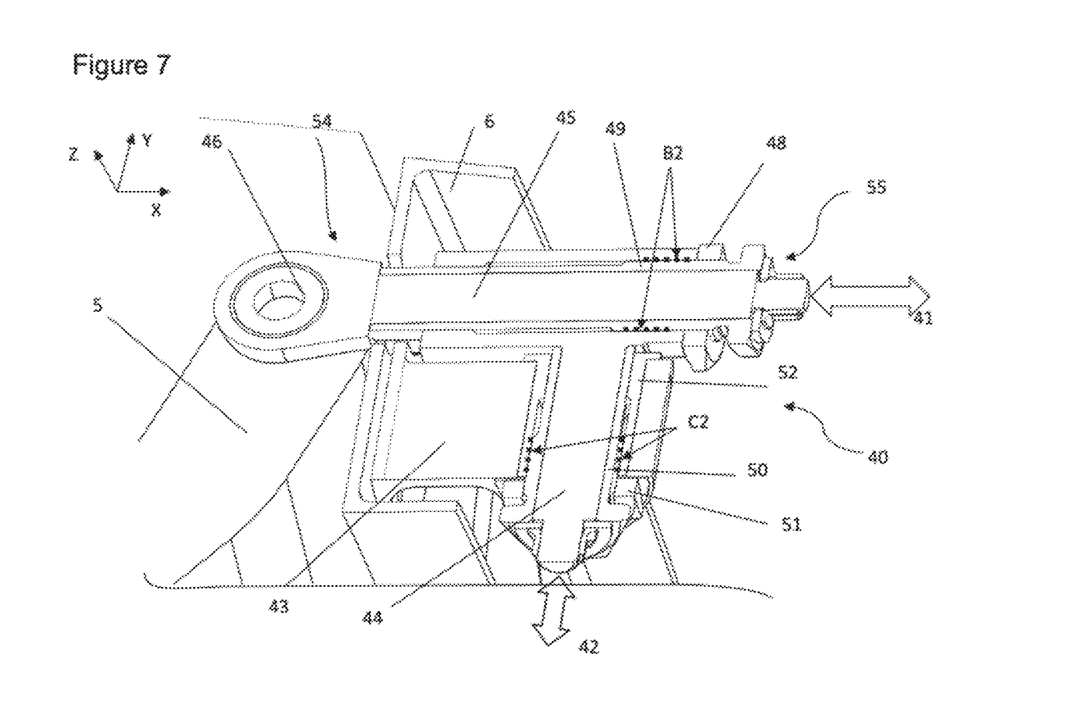
FIG. 7 is a cross-section view of the upper fastener in the planes XY.

The partial cross-section view in FIG. 7 shows the upper fastener 40 in the plane XY, the frame 6 of the door coaming, and the components of the upper fastener 40: the base 43 and the trolley 44.

The lower portion of the trolley 44 has a chassis forming a "T" comprising two cylindrical members: one member that is hollow, partially threaded and aligned with the axis X forming the horizontal bar of the "T", and one member that is solid and aligned with the axis Y forming the vertical bar of the "T".

The door-arm pin 45 and the threaded sleeve 49 thereof are inserted into this horizontal bar of the "T" of the chassis of the trolley 44. Thus, the translational adjustment along the axis X (double arrow 41) of the upper fastener 40 is provided in the horizontal bar of the "T" by the screw-nut connection B2, in which the threaded sleeve 49 corresponds to the screw and the partially threaded hollow cylinder of the chassis of the trolley 44 corresponds to the nut.

The vertical bar of the "T" of the chassis of the trolley 44 is inserted into the threaded sleeve 50 in the screw-nut connection C2 with the threaded ring 52 rigidly fitted into the base 43. This screw-nut connection C2 provides the translational adjustment along the axis Y (double arrow 42) of the upper fastener 40 in the vertical bar of the "T".

Figure 8:
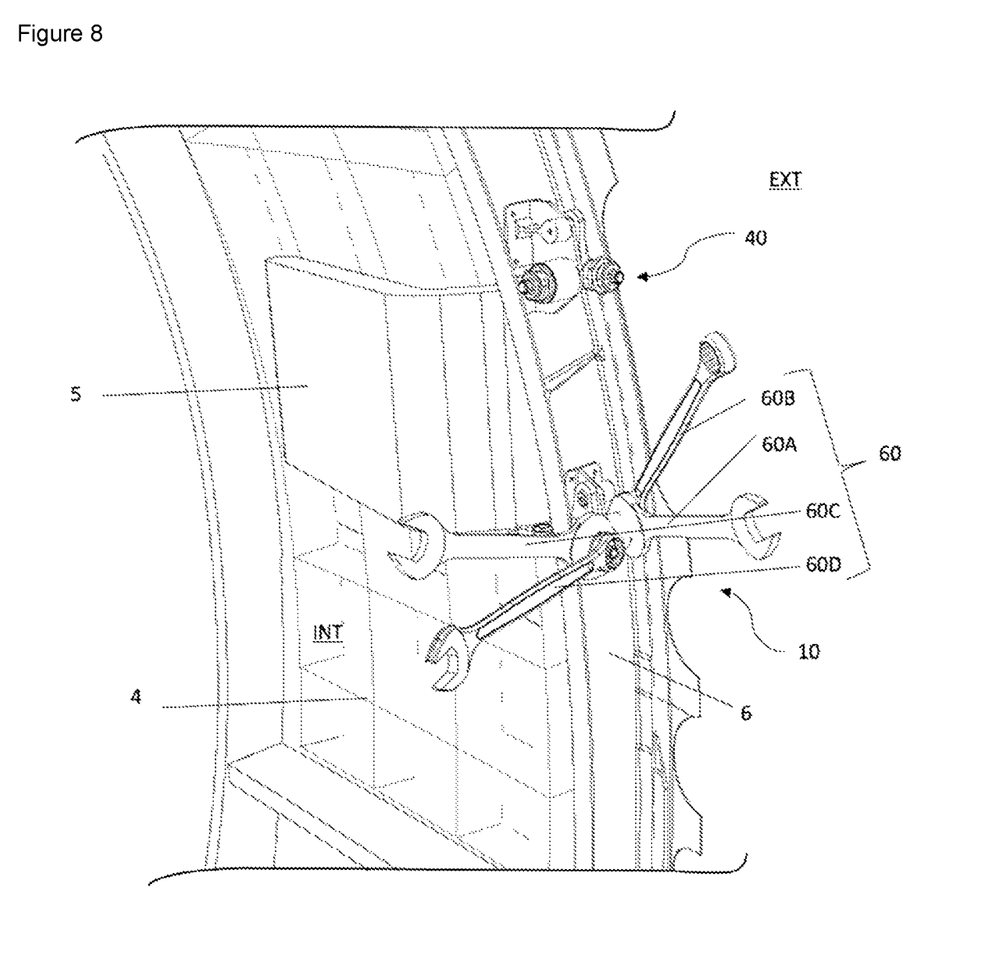
FIG. 8 is a partial perspective view of the door shown in FIG. 2, with the positioning of a tool for adjusting the door according to the invention.

FIG. 8 shows the positioning of the tools 60 used to act on the screw-nut systems and make adjustments during installation of the door. Only the tools for the lower fastener 10 are shown.

During these adjustment operations, a first spanner 60A, 60C holds the locknut 21, 18 in the unlocked position. The trolley 14, respectively the door-arm pin 15, is pressed axially against a flat bearing surface 20A of the threaded sleeve 20, respectively 19A of the threaded sleeve 19, under the effect of the axial force generated by the tightening torque applied to the clamping nut 29, respectively the clamping nut 27.

The threaded sleeve 20, respectively the threaded sleeve 19, is compressed between the trolley 14, respectively the door-arm pin 15, and the bearing washer 28, respectively the bearing washer 26, which has a braking effect preventing the rotation required to make the adjustment.

Thus, before the adjustment operations can continue, the clamping nut 29, respectively the clamping nut 27, is loosened until the compressive stress exerted on the threaded sleeve 20, respectively the threaded sleeve 19, is released, i.e. until a clearance is created at one of the flat ends of the threaded sleeve 20, respectively the threaded sleeve 19, which acts as a bearing surface for either the bearing washer 28, respectively the bearing washer 26, or the trolley 14, respectively the door-arm pin 15.

The second spanner 60B, 60D then applies torque to the threaded sleeve 20, 19 acting as a screw.

Similarly for the upper fastener 40, a first spanner holds the locknut 51, 48 in the unlocked position, while a second spanner applies torque to the threaded sleeve 50, 49 acting as a screw.

The rotation of the screw through the thread transforms this rotational movement into a translational movement of the screw as a function of direction. When the desired adjustment has been made, the first spanner applies a tightening torque to the corresponding locknut 21, 18, 51, 48 to lock this adjustment position. Once all of these adjustments have been made, a tightening torque is applied to the clamping nuts 27, 29, 57, 59 to set the position of the door along the axes X and Y of the airplane.

In this example embodiment, the screw-nut connections for adjustments along X (double arrows 11, 41) are positioned at the front of the coaming, the screw-nut connection for adjustments along Y (double arrow 12) of the lower fastener 10 is oriented towards the outside EXT of the cabin, and the screw-nut connection for adjustments along Y (double arrow 42) of the upper fastener 40 is oriented towards the inside INT of the cabin.

Applying an adjustment of the same angular value and in the same direction along the axis X, respectively along the axis Y, to the two screw-nut connections results in a translational adjustment along the axis X, respectively along the axis Y, of the door 2 (see FIG. 2).

Applying an adjustment of the same angular value and in opposite directions along the axis Y, respectively along the axis X, to the two screw-nut connections results in a rotational adjustment about an axis parallel to the axis X, respectively about an axis parallel to the axis Y, of the door 2 (see FIG. 2). Under these conditions, the rotation of the door about an axis parallel to the axis X occurs about an axis equidistant from the two adjustment axes Y of the two fasteners and parallel to the axis X of the airplane. Similarly, the rotation of the door about an axis parallel to the axis Y occurs about an axis equidistant from the two adjustment axes X of the two fasteners and parallel to the axis Y of the airplane.

The invention is not limited to the examples described and shown. For example, the translational adjustment movement can be driven by a mechanism other than a screw-nut system, such as a micro-piston or a continuous-drive electric micromotor.

Furthermore, the orientation of the adjustments along X and Y can be adapted to suit the layout of the fuselage of the aircraft, and adjustments can be made in any direction of the adjustment axes.

The invention claimed is:
1. An aircraft door (2) mounted in a fuselage in a reference frame X, Y, Z and comprising:
   a casing (3) forming a coaming rigidly connected to the fuselage,
   a door leaf (4) and
   a door arm (5),
   the door arm connecting the door leaf to the casing by a hanging system enabling the door leaf (4) to be installed and a position thereof relative to the fuselage to be adjusted,
   the system comprising a pair of fasteners (10, 40) each comprising a pivot (16, 46) that is rotary about a common axis parallel to the axis Z, a base (13, 43) fastened to the casing (3), and a trolley (14, 44) that is movable on the base (13, 43) along the axis Y, the base and the trolley of each fastener forming two translational adjustment links in directions parallel to the axes X and Y to adjust the position of the door,
   wherein for each of the fasteners (10, 40), the directions of the adjustment axes (11, 12, 41, 42) are secant in a plane parallel to the plane XY.
2. The aircraft door as claimed in claim 1, wherein the trolley (14, 44) of each fastener is provided with a chassis comprising two cylindrical bodies forming a "T" with:
   a solid cylinder that forms a vertical bar of the "T" oriented in a direction parallel to the axis Y of the aircraft (1) and, together with the base (13, 43), forms the translational adjustment link for the door leaf (4) along the axis Y, and
   a hollow cylinder that forms a horizontal bar of the "T" oriented in a direction parallel to the axis X of the aircraft (1) and, together with a pin of the door arm (15, 45), forms the translational adjustment link for the door leaf (4) along the axis X.
3. The aircraft door as claimed in claim 1, wherein the fasteners (10, 40) have a mechanism for preventing rotation about the axis Y arranged between the trolley (14, 44) and the base (13, 43), in the form of a sliding guide link (D1, D2) oriented along the axis Y.
4. The aircraft door as claimed in claim 3, wherein the sliding guide link (D1, D2) has an oblong cross-section with straight parallel longitudinal sides, and passes through bores (13A, 14A, 43A, 44A) in the base (13, 43) and the trolley (14, 44).
5. The aircraft door as claimed in claim 1, wherein the adjustment links are screw-nut connections (B1, C1, B2, C2).
6. The aircraft door as claimed in claim 5, wherein the screw for the adjustment links along the axis X of the aircraft (B1, B2) is a threaded sleeve (19, 49) and the nut is the hollow cylinder belonging to the chassis of the trolley (14, 44), and the screw for the adjustment links along the axis Y of the aircraft (C1, C2) is a threaded sleeve (20, 50) and the nut is a threaded ring (22, 52) rigidly connected to the base (13, 43).
7. The aircraft door as claimed in claim 6, wherein the screw-nut connections (B1, C1, B2, C2) are only provided over a limited length of each adjustment axis.
8. An aircraft (1) comprising at least one door as claimed in claim 1.
9. An aircraft door (2) mounted in a fuselage in a reference frame X, Y, Z and comprising:
   a casing (3) forming a coaming rigidly connected to the fuselage,
   a door leaf (4) and
   a door arm (5),
   the door arm connecting the door leaf to the casing by a hanging system enabling the door leaf (4) to be installed and a position thereof relative to the fuselage to be adjusted,
   the system comprising a pair of fasteners (10, 40) each comprising a pivot (16, 46) that is rotary about a common axis parallel to the axis Z, a base (13, 43) fastened to the casing (3), and a trolley (14, 44) that is moveable on the base (13, 43) along the axis Y, the base and the trolley of each fastener forming two translational adjustment links in directions parallel to the axes X and Y to adjust the position of the door, wherein for each of the fasteners (10, 40), the directions of the adjustment axes (11, 12, 41, 42) are secant in a plane parallel to the plane XY,
   wherein the adjustment axes (11, 12, 41, 42) are oriented as follows:
   along the axis X of the aircraft (1), the adjustment axes of the fasteners are oriented in the same direction and are outside the door coaming, and
   along the axis Y of the aircraft (1), the adjustment axes are oriented in opposite directions, with the axis of an upper fastener being oriented towards the inside of the cabin and the axis of a lower fastener being oriented towards the outside of the cabin, the upper fastener being arranged above the lower fastener along the axis Z.
10. A method for installing an aircraft door, the aircraft door (2) is mounted in a fuselage in a reference frame X, Y, Z and includes: a casing (3) forming a coaming rigidly connected to the fuselage, a door leaf (4) and a door arm (5); the door arm connecting the door leaf to the casing by a hanging system enabling the door leaf (4) to be installed a position thereof relative to the fuselage to be adjusted; the system including a pair of fasteners (10, 40) each comprising a pivot (16, 46) that is rotary about a common axis parallel to the axis Z, a base (13, 43) fastened to the casing (3), and a trolley (14, 44) that is movable on the base (13, 43) along the axis Y, the base and the trolley of each fastener forming two translational adjustment links in directions parallel to the axes X and Y to adjust the position of the door, wherein for each of the fasteners (10, 40), the directions of the adjustment (11, 12, 41, 42) re secant in a plane parallel to the plane XY,
   the method comprising a preliminary door positioning phase involving: joining the door arm (5) to the door leaf (4),
   connecting each fastener (10, 40) of the hanging system to the casing (3) and to the door arm (5),
   positioning the door leaf (4) in the casing (3) in the closed position, the method being characterized in that it comprises an adjustment phase for the door in the closed position that follows the preliminary phase according to at least one of the following steps:
   to move the door in translation along the axis X of the aircraft (1): in the upper fastener (40) and the lower fastener (10), move the threaded adjustment sleeves (19, 49) oriented in the direction X of the aircraft (1) by the same amount and in the same direction,
   to move the door in translation along the axis Y of the aircraft (1): in the upper fastener and the lower fastener, move the threaded adjustment sleeves (20, 50) oriented in the direction Y of the aircraft (1) by the same amount and in the same direction,
   to rotate the door about an axis parallel to the axis X of the aircraft (1): in the upper fastener and the lower fastener, move the threaded adjustment sleeves (20, 50)

oriented in the direction Y of the aircraft (1) by the same amount and in opposite directions, and to rotate the door about an axis parallel to the axis Y of the aircraft (1): in the upper fastener and the lower fastener, move the threaded adjustment sleeves (19, 49) oriented in the direction X of the aircraft (1) by the same amount and in opposite directions.

11. The aircraft door installation method as claimed in claim 10, wherein a first spanner (60A, 60C) holds a locknut (18, 21, 48, 51) in an unlocked position while a second spanner (60B, 60D) applies torque to the threaded sleeve (19, 20, 49, 50).

12. The aircraft door installation method as claimed in claim 10, wherein a tightening torque is applied to the clamping nuts (27, 29, 57, 59) along the axes X and Y of the aircraft (1) once all of the adjustment steps have been completed.

* * * * *